United States Patent [19]
Auble et al.

[11] 3,880,267
[45] Apr. 29, 1975

[54] COUPLING DEVICE HAVING MEANS FOR RELIEVING CIRCUMFERENTIAL STRESSES

[75] Inventors: Ronald E. Auble, Henrietta; Wells Coleman, Brighton, both of N.Y.

[73] Assignee: The Gleason Works, Rochester, N.Y.

[22] Filed: Feb. 12, 1973

[21] Appl. No.: 331,938

[52] U.S. Cl.................................. 192/108; 192/55
[51] Int. Cl............................................ F16d 11/00
[58] Field of Search.......... 192/55, 82 T, 67 R, 107, 192/108; 74/421; 64/9, 14

[56] References Cited
UNITED STATES PATENTS
1,532,564  4/1925  Von Soden-Fraunhofen...... 192/108

*Primary Examiner*—Samuel Scott
*Assistant Examiner*—Frank H. McKenzie, Jr.
*Attorney, Agent, or Firm*—Ralph E. Harper

[57] ABSTRACT

A coupling device assembled from first and second clutch members which each have lug elements formed on a face thereof so that lug elements of one clutch member can be brought into coupling contact with lug elements of the other clutch member to form a driving connection therebetween is provided with means for relieving circumferential stresses which develop between contacting lug elements of the two clutch members when the clutch members are coupled together in a driving relationship and when one of the clutch members is expanding at a greater rate than the other clutch member.

12 Claims, 10 Drawing Figures

3,880,267

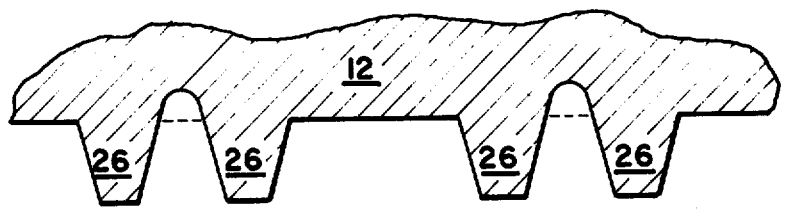
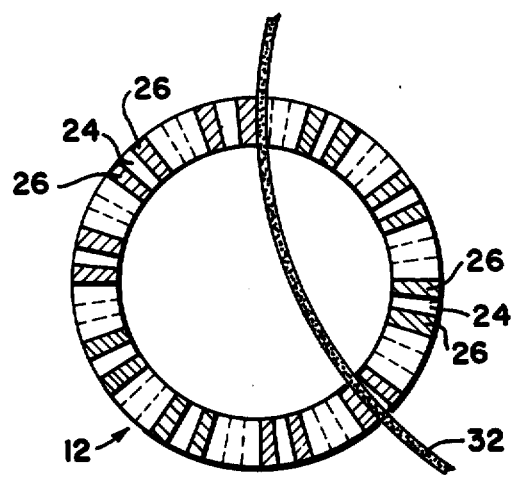
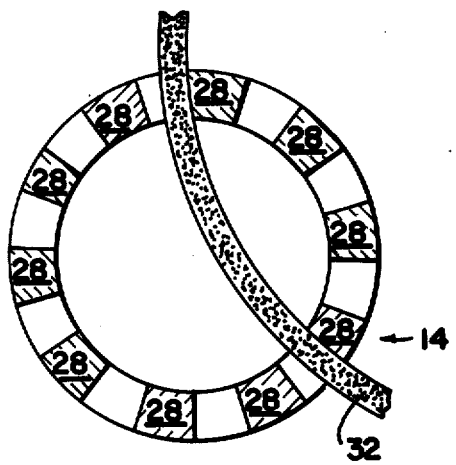
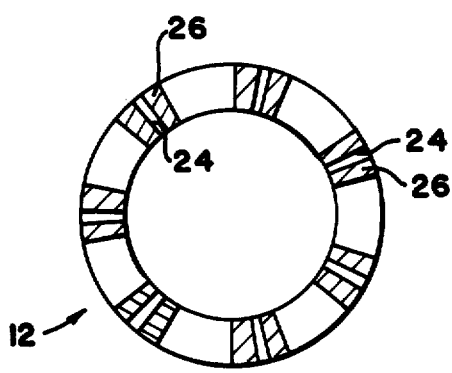
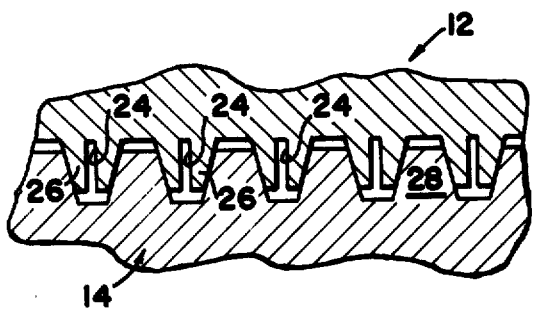
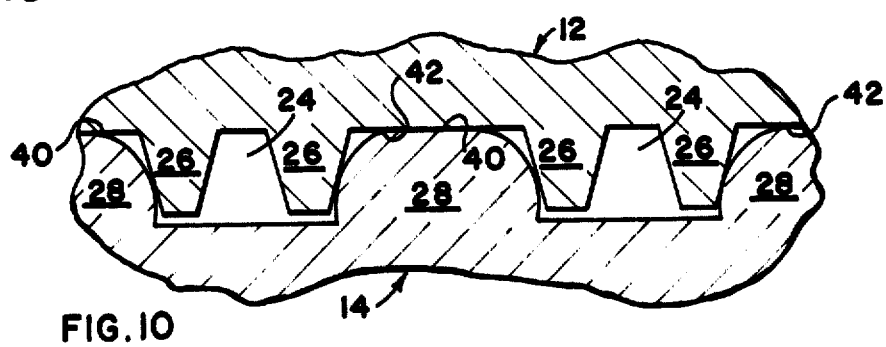

COUPLING DEVICE HAVING MEANS FOR RELIEVING CIRCUMFERENTIAL STRESSES

BACKGROUND AND BRIEF SUMMARY OF THE INVENTION

This invention is related to improvements in face couplings of a type known per se, as disclosed, for example, in U.S. Pat. Nos. 2,384,582 and 2,427,641. More specifically, the invention is concerned with improvements in couplings assembled from a pair of clutch members having different thermal expansion characteristics, such as an assembly formed from a steel clutch member and a ceramic clutch member for use in a gas turbine application.

Coupling devices of the type described in the above patents are assembled from a pair of clutch members which are each provided with a series of equally spaced and precisely formed lug elements on a face thereof so that the lug elements of one clutch member can be brought into mating engagement with the lug elements of the other clutch member. It has been found that coupling devices of this type which are assembled from clutch members having different thermal expansion characteristics may be subject to coupling failure or failure of individual lug elements which are brought into highly loaded engagement with mating lug elements of an opposing clutch member of the assembly. Such failure is due to certain types of circumferential stresses imposed upon the loaded lug elements during a more rapid thermal growth of one clutch member relative to the other. It is known in assemblies of this type that the more rapidly expanding clutch member tends to expand radially outwardly and circumferentially relative to the less rapidly expanding member. However, in a typical assembly, the mating lug elements are provided with positive pressure angles on their sides so that the clutch members can be tightly clamped together in a way that will distribute the axial clamping load completely to the sides of the lug elements. Tight clamping is essential to compensate for lengthwise expansion of clamping bolts used in the assembly, but the loads imposed upon the individual lug elements by such tight clamping substantially resist a natural tendency for one clutch member to expand radially more rapidly than its mating clutch member. In fact, it has been found that even though the main body portion of an expanding clutch member may expand radially by a limited amount, its lug elements tend to be completely resisted in their need for radial expansion, and this results in a form of circumferential growth of the lug elements. This circumferential growth imposes a high stress on tooth root fillets of opposing lug elements with which the expanding lug elements are engaged, and such circumferential stresses may cause the weaker clutch member of the pair to split apart. An example of an application where this problem can occur is in the design of a gas turbine in which face coupling devices are commonly used between sections of its rotor drive shaft. In certain designs, face coupling devices are formed from a pair of clutch members in which one clutch member is formed from a ceramic material and the other clutch member is formed from steel. In this example, the ceramic material has a higher modulus of elasticity, i.e., it is stiffer (and less elastic), but it has a much lower tensile strength and a much lower coefficient of thermal expansion than the steel material. Thus, a tightly clamped assembly of this design would have a tendency to split the ceramic material clutch member with high stresses applied to the tooth root fillets of such a member.

In accordance with the present invention, coupling devices of the type aforesaid are provided with means for relieving circumferential stresses between clutch members having differing expansion characteristics, even though such clutch members are tightly clamped together in accordance with known practices. The means for relieving circumferential stresses preferably includes a structural modification of the coupling device, in a manner to be described in detail below, to accommodate circumferential growth of one clutch member relative to its mating clutch member. This structural modification can drastically reduce coupling failure even though the design of the coupling provides for very restricted radial growth between clutch members which are clamped together. A further modification of the clutch device can provide for substantially improved radial expansion of one clutch member relative to its mating member to thereby relieve circumferential stresses between the two members by permitting a relatively easy radial "sliding" of one clutch member relative to the other.

Considering a typical coupling device assembled from first and second face clutch members in which the first clutch member has a greater thermal expansion characteristic and greater elasticity than the second clutch member, it has been found that circumferential stresses between the two clutch members can be relieved by providing one or more gaps or spaces in the face of the first clutch member. These gaps or spaces may be in the form of relatively wide areas from which lugs have been removed from the first clutch member or may consist of a provision for slots cut into the lug elements of the first clutch member. As a result of this arrangement, lug elements of the same first clutch member, which are carried adjacent to such gaps, can expand or grow into the gaps while the sidewalls of such lug elements are loaded against lug elements carried by the second clutch member. Thus, circumferential stresses which might otherwise overload the weaker lug elements of the second clutch member are relieved by the fact that the relatively more elastic lug elements of the first clutch member can expand and move in circumferential directions which do not overload the lug elements which they engage. Thus, the basic discovery of this invention is that a pair of clutch members can be brought into engagement with each other in such a way as to allow for a substantially greater expansion of one of the clutch members relative to the other clutch member against which it is loaded, and this can be done without disrupting the integrity of the coupling or the preciseness with which its component parts are fitted together. This is not the same as known prior art techniques which have merely provided for slots in gear teeth to reduce stresses in the teeth which are slotted, as disclosed, for example, in U.S. Pat. Nos. 2,335,504 and 3,636,792. In contrast to these prior art techniques for gears, the present invention provides for a reduction in stresses on a weaker lug element without any removal of material from the weaker lug element itself.

In order to provide for improved radial expansion between face clutch members of the type discussed above, the lug elements of the second clutch member (the member having the lower expansion characteristic and the weaker lugs) are dimensioned so that their toplands engage the bottomlands of the first clutch member when the two clutch members are axially clamped to form an assembled coupling device. This is known as a "bottoming" of one clutch member relative to the other, and the result of such a design is to transfer some of the axial clamping load from the sidewalls of the lug elements to the toplands and bottomlands between the two clutch members. Under a given required bolting load, this reduces the total frictional force resisting differential radial expansion between the two clutch members. In addition, this arrangement also preserves necessary preload on the sides of lug elements to insure desired conditions of zero backlash and rigid alignment between the clutch members. These and other features and advantages of the present invention will be discussed in greater detail below. In that discussion reference will be made to the accompanying drawings as briefly described below.

BRIEF DESCRIPTION OF DRAWINGS

FIG. 5 is a view similar to FIG. 4, illustrating a design for increased flexibility in the lug elements of the first clutch member;

FIG. 6 is a view similar to FIG. 2, but showing an embodiment of a first clutch member having lug elements with concave sidewall configurations;

FIG. 7 is a view similar to FIG. 3, but showing an embodiment of a second clutch member for use with the first clutch member of FIG. 6, with the lug elements of this clutch member having sidewalls which are convex;

FIG. 8 illustrates a different embodiment of the invention in which the first clutch member is provided with slots or gaps within its individual lug elements;

FIG. 9 is a development of a transverse section of the coupling shown in FIG. 8; and FIG. 10 is a development of an embodiment which provides for improved radial expansion between the two clutch members of the coupling device of this invention.

DETAILED DESCRIPTION OF INVENTION

Figure 1:
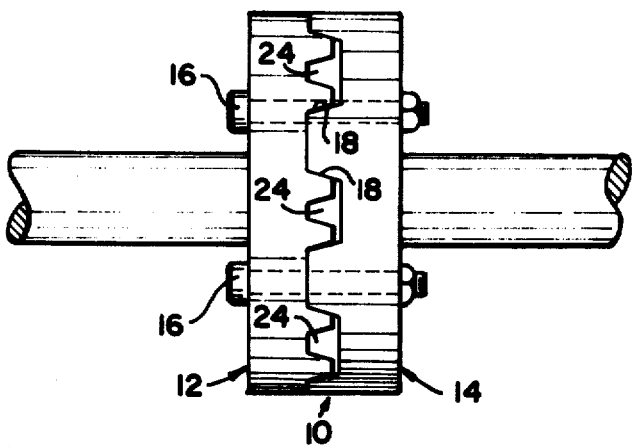
FIG. 1 is an elevational view of a typical coupling device of the type contemplated by the present invention.

FIG. 1 illustrates a relatively simple coupling device 10 of the type contemplated by this invention. The illustrated coupling device is assembled from a first clutch member 12 and a second clutch member 14, and each of the clutch members have a series of lug elements formed on a face thereof so that the lug elements of one clutch member can be brought into coupling contact with the lug elements of the other clutch member to form a driving connection therebetween. The first and second clutch members 12 and 14 are clamped together with clamping bolts 16 or with other known means for maintaining the tooth clutch members in a face-to-face contact. Individual lug elements have inclined side wall surfaces 18 which have positive slope angles, or pressure angles, (the positive direction of the slope is defined as the direction which tends to make the lug element wider at is base than at its tip).

Although lug elements are generally provided with positive slope angles on both of their side walls, it can be appreciated that only a single side wall needs to be sloped to achieve a benefit from the present invention.

Figure 2:
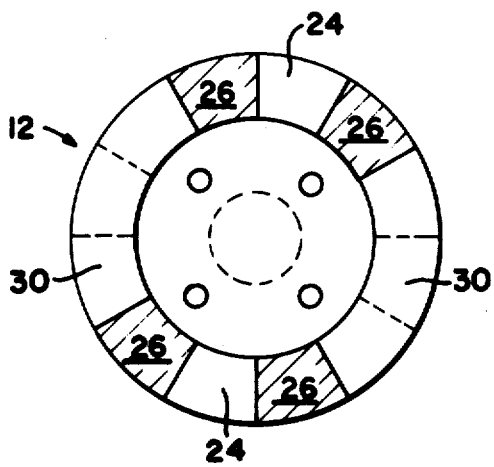
FIG. 2 is a sectional view taken in the pitch plane perpendicular to the axis of a first clutch member of a coupling device of the type shown in FIG. 1.
Figure 3:
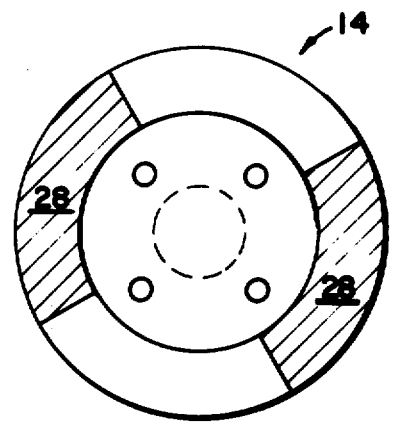
FIG. 3 is a view similar to FIG. 2 showing a similar sectional view of a second clutch member of the pair.

FIGS. 2 and 3 illustrate relative dimensions and numbers of lug elements carried by two clutch members 12 and 14, respectively. The embodiment of FIGS. 2 and 3 is relatively simple with a very small number of lug elements provided on each clutch member, and this is done for clarity and for ease and explanation of the basic invention. However, it is to be understood that a greater number of lug elements, such as is illustrated in FIGS. 1, 6 and 7, may be provided.

The first clutch member 12 is made from a more elastic material than is the second clutch member 14. The more elastic material of the first clutch member may be steel, and the less elastic material of the second clutch member may be a ceramic material. Thus, in the illustrated embodiment, the first clutch member 12 is stronger and has a higher coefficient of thermal expansion than the second clutch member 14. When the two clutch members 12 and 14 are tightly clamped together in a typical installation, a temperature increase in the coupling device will result in circumferential stresses developing between mating lug elements of the two clutch members. These circumferential stresses are relieved by the embodiments illustrated in FIGS. 1–9 by providing one or more gaps 24 between lug elements 26 of the more elastic clutch member 12. These gaps may be specially formed, even in the lug elements themselves as illustrated in FIGS. 8 and 9, or they may comprise the usual spaces provided between a series of equally spaced lug elements in clutch members formed in accordance with the teachings of Wildhaber U.S. Pat. Nos. 2,384,582 and 2,427,641. The relationship between the first clutch member 12 and the second clutch member 14 is such that the gaps 24 provided in the first clutch member 12 will not be filled by any mating lug elements carried by the second clutch member 14. As a result of this arrangement, each of the more elastic lug elements 26 of the first clutch member will be loaded on one side wall only, and the opposite side wall will be free to bend into the adjoining gap. Therefore, when the two clutch members 12 and 14 are brought into assembled engagement and clamped together, the unsupported lug elements 26 of the clutch element 12 are free to bend to relieve stresses that could otherwise develop on lug elements 28 of the second clutch member due to differences in circumferential expansion between the two clutch members. The lug elements 28 of the second clutch member 14 are illustrated as being of a greater thickness than lug elements of the first clutch member 12 to compensate for the fact that the clutch member 14 is formed from a weaker material than the material of the first clutch member 12. In order to accommodate the thicker lug element 28 in the second clutch member 14, relatively wide spaces 30 are provided in the first clutch member 12 to receive the lug elements 28. These spaces 30 may be formed by removing lug elements that would otherwise be formed in those spaces (as indicated by the dotted lines) if the clutch member is produced in accordance with the teachings of the aforesaid patents. Likewise, wide spaces are provided in the clutch member 14 to receive the lug elements and intervening gaps of the first clutch member.

Figure 4:
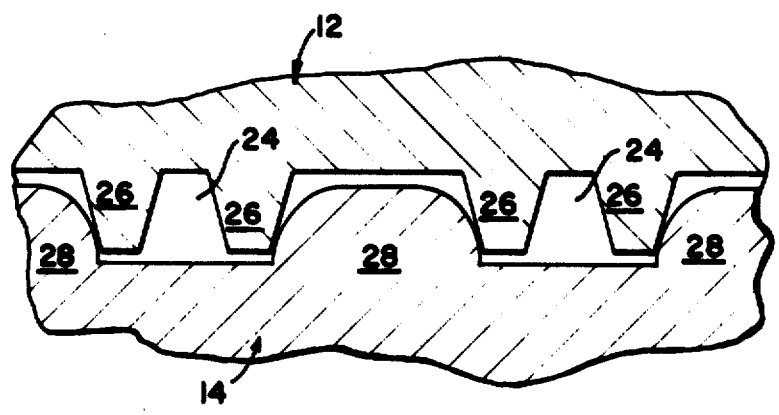
FIG. 4 is a development of a transverse sectional view of the coupling design shown in FIGS. 2 and 3.

FIG. 4 illustrates a development of the relationship which would be established between the clutch members 12 and 14 of FIGS. 1–3. It can be seen that the lug elements 26 and 28 of the two clutch members have positive slope pressure angles on their side walls, as discussed above, and this results in a loading of the side walls of the two clutch members when the assembly is clamped together. By providing positive pressure angles on the lug elements, precise centering and rigid alignment of the two clutch members is assured in accordance with known practices. FIG. 4 also illustrates that a profile mismatch may be provided between contacting side walls of the lug elements 26 and 28 of the two clutch members. This profile mismatch is a form of depthwise mismatch between engaging side surfaces of the lug elements and can be formed in a number of known ways. The simplest type of mismatch is illustrated wherein the side walls of the lug elements 26 ar relatively straightlined elements (depthwise from the tips to the roots of the lug elements) while the corresponding side walls of the lug elements 28 are formed with a curved, or even circular, arc. This provides for depthwise control of the position of load application on the lug elements and prevents overloading of the tips of the ceramic elements as the results of extreme circumferential stresses developing between the two clutch members 12 and 14. Thus, the amount of profile mismatch which is designed into the clutch members 12 and 14 will depend upon the relative stiffness and strength of the respective lug elements. It is preferred in some cases that the profile mismatch provide for a contact of the more elastic lug elements near their tips. The profile mismatch may include a depthwise curvature of the lug elements 26 as an alternative to, or in combination with, the mismatch which has been just described.

FIG. 5 illustrates a lug element profile for the more eleastic first clutch member 12 which provides for an increased flexibility for its lug elements 26 by increasing the whole depth of the lug elements 26. Also, lug element thickness may be adjusted to adjust for strength and flexibility.

FIGS. 6 and 7 illustrate clutch members 12 and 14, respectively, which are formed in accordance with the teachings of the above-mentioned Wildhaber patents and which include a greater number of lug elements than the relatively simple designs discussed with reference to FIGS. 1–3. Generally, a large number of lug elements and gaps are employed in a coupling to provide satisfactory load capacity and accuracy of alignment of the two clutch members. In addition, the lug elements of each clutch member of the embodiment illustrated in FIGS. 6 and 7 are curved in their lengthwise directions as a result of the method of manufacture which utilizes a cup-shaped grinding wheel 32 (which is only partially illustrated). The clutch member 12 includes lug elements 26 having concave curvatures of side walls while the lug elements 28 of the second clutch member 14 have convex side walls in a lengthwise direction. It can be seen that the side walls of the lug elements 26 are produced by the outside cutting surface of the grinding wheel 32, and the side walls of the lug elements 28 are produced by an inside cutting surface of a grinding wheel 32. Again, the dotted line positions shown in FIG. 6 are representative of lug elements which would be formed by the basic method of the above Wildhaber patents, but these lug elements have been removed to accommodate the thicker lug elements formed on the clutch member 14. As with the previously discussed embodiment, gaps 24 are maintained in the first clutch member to permit circumferential growth of the lug elements 26 into such gaps. Preferably the lug elements 26 and 28 of the two clutch members 12 and 14 are provided with lengthwise mismatch which can be produced by using grinding wheels 32 of different diameters. This technique is described in U.S. Pat. No. 2,384,582. Of course, the differences in grinding wheel diameters are selected so that a given grinding wheel will not cut through any of the thicker lug elements of the second clutch member 28, as will be understood by those skilled in this art. Of course, the convex and concave curvatures which are illustrated can be reversed for the two clutch members, or both clutch members can be provided with the same type of lengthwise curvature of its lug elements, as is known in this art. In addition, it is preferred that the lug elements be shaped with a "half-barrel" shape, of a design known in this art, to assist in relative radial movement between the two clutch members.

FIGS. 8 and 9 show a somewhat different embodiment in which the gaps 24 are in the form of slots formed in individual lug elements of the more elastic first clutch member 12. The width of the slots must be sufficient for practical production machineability and such as to permit lateral deflection of the opposite parts of each lug element 26 into the gap which is provided. Typically the width of the gaps 24 would be at least 10 per cent of the average width of the lug elements 26.

FIG. 10 illustrates a different embodiment of the invention for relieving circumferential stresses in clutch members 12 and 14 of the type discussed above. In addition, the provision of gaps 24 are included in the FIG. 10 embodiment in combination with a further improvement which includes means for increasing the ease with which the first clutch member 12 can radially expand relative to the second clutch member 14. As discussed above, clutch members 12 and 14 are commonly clamped together to carry all axial loads on the positive slope surfaces of their engaging lug elements. This is done to insure precise centering and rigid alignment of the two clutch members. It has been a practice to relate the two clutch members to one another so that there is no bottoming of the toplands of one member against the bottomlands of a mating member, as shown in the development of FIG. 4. As a result of this prior art practice, heavy frictional resistance between the side walls of engaging lug elements makes it nearly impossible for one clutch member to expand radially relative to its mate. It has now been discovered that this resistance to radial expansion can be decreased by transferring some of the axial load of the two clutch members from their engaged side walls to the toplands and bottomlands of certain lug elements. As shown in FIG. 10, the toplands 40 of the less elastic lug elements 28 of the ceramic clutch member 14 are designed to engage the bottomlands 42 of the more elastic clutch member 12. This transfers some of the load from the side walls of the engaging lug elements 26 and 28. This results in a certain amount of frictional contact between the toplands and bottomlands which are brought into engagement with each other, which is advantageous. Radial expansion of one clutch member relative to the other is resisted less by frictional contact in a plane intersecting the center axis of the coupling device at a right angle than by planes at other angles to the center point of each clutch member. In order to maintain rigid axial alignment of the two clutch members after clamping and to provide the requisite zero backlash desired between such clutch members, it is necessary that some of the axial clamping load be carried by the engaging side walls even though one member is bottoming relative to the other. Typically, the clutch members are designed so that the lug elements 28 of the second clutch member will initially contact (a) the side walls and then (b) the bottomlands of lug elements 26 of the first clutch member during assembly and axially clamping of the two clutch members. It can be seen in the FIG. 10 view that the lug elements 26 of the more elastic clutch member do not bottom against the clutch member 14. This is to provide complete freedom for the elastic lug elements 26 to grow into the gaps 24 without resistance to such movement.

Having described certain embodiments of the invention, it can be appreciated that clutch members can be designed with structural modifications in shapes, dimensions, choices of materials, and in other ways, to practice the teachings of this invention. All such changes as would be within the skill of the art in view of the teachings of this invention are intended to be included within the scope of the claims which follow.

What is claimed is:

1. In a coupling device assembled from first and second clutch members which each have lug elements formed on a face thereof so that the lug elements of one clutch member can be brought into coupling contact with lug elements of the other clutch member to form a driving connection thereof, said lug elements of one clutch member being of a type in which individual lug elements are convexly curved lengthwise, with the lug elements of the other clutch member being of the type in which individual lug elements are concavely curved lengthwise, there further being a lengthwise mismatch between said convex and concave curvatures of the lug elements of said clutch members, and wherein said first clutch member has a characteristic of greater elasticity than said second clutch member, the improvement comprising means for relieving circumferential stresses which develop between contacting lug elements of the two clutch members when one clutch members are coupled together in a driving relationship and when the clutch member is expanding at a greater rate than the other clutch member.

2. The improvement of claim 1 wherein said means for relieving circumferential stresses comprises one or more gaps provided in the face of said first clutch member for receiving thermal growth of lug elements carried adjacent to said gaps when side walls of said same lug elements are loaded against lug elements carried by said second clutch members.

3. The improvement of claim 2 wherein said first clutch member is formed with more than one additional lug element and more than one additional gap than said second clutch member.

4. The improvement of claim 2 wherein said gaps comprise slots formed in lug elements of said first clutch member.

5. The improvement of claim 3 wherein said second clutch member is formed with a series of equally spaced positions for lug elements about a face thereof and wherein said spaces are of sufficient size to receive lug elements and associated gaps of said first clutch member when the two clutch members are coupled together.

6. The improvement of claim 1 wherein said two clutch members are formed from dissimilar materials.

7. The improvement of claim 6 wherein said first clutch member is formed from a steel material and said second clutch member is formed from a ceramic material.

8. The improvement of claim 1 wherein said lugs of the two clutch members have positive slope angles in the axial direction.

9. The improvement of claim 1 wherein there is profile mismatch between the profiles of contacting side walls of said clutch members.

10. The improvement of claim 2 wherein said means for relieving circumferential stresses includes a structural relationship in which said lug elements of said second clutch member are dimensioned so that their toplands engage the bottomlands of said first clutch member, when the two clutch members are axially clamped to form an assembled coupling device, to thereby increase the ease with which said first clutch member can radially expand relative to said second clutch member.

11. The improvement of claim 1 wherein said last-named means includes a structural relationship between the contacting lugs of said two clutch members, said structural relationship providing for a transfer of loading from contacting side walls of opposing lugs to (a) the toplands of said second clutch member and (b) the bottomlands of said first clutch member.

12. The improvement of claim 11 wherein lugs of said second clutch member are formed to initially contact (a) the side walls and then (b) the bottomlands of lugs formed in said first clutch member, during assembly and axial clamping of the two clutch members so as to maintain rigid axial alignment of the two clutch members after clamping.

* * * * *